United States Patent [19]
Serrand
[11] Patent Number: 5,023,069
[45] Date of Patent: Jun. 11, 1991

[54] PROCESS FOR REMOVING SULFUR MOIETIES FROM CLAUS TAIL-GAS

[75] Inventor: Willibald Serrand, Buxheim, Fed. Rep. of Germany
[73] Assignee: Exxon Research & Engineering Company, Florham Park, N.J.

[21] Appl. No.: 320,727
[22] Filed: Mar. 8, 1989
[30] Foreign Application Priority Data
Mar. 9, 1988 [GB] United Kingdom ................ 8805552
[51] Int. Cl.[5] .............................................. C01B 17/04
[52] U.S. Cl. ................................................ 423/574 R
[58] Field of Search ............................ 423/576, 574 R

[56] References Cited

U.S. PATENT DOCUMENTS 3,637,352 1/1972 Bratzier et al. ................ 423/574 R
3,890,120 6/1975 Guyot et al. ........................... 55/62
4,426,369 1/1984 Palm .................................. 423/576
4,935,221 6/1990 Bronfenbrenner et al. .... 423/574 R

FOREIGN PATENT DOCUMENTS 954674 9/1974 Canada .
283793 9/1988 European Pat. Off. ........ 423/574 R
1570161 6/1969 France .

OTHER PUBLICATIONS

Goar, "Fundamentals of Sulfur Recovery by the Claus Process," 1977 Gas Conditioning Conferences, pp. 1, 9.
"Sulfur Recovery" a pamphlet by Lurgi, Jul. 1987.
"Dry Oxidation Processes for Removal of Sulfur Compounds", Arthur L. Kohl, Gas Purification, 4th Ed., Gulf Publishing Company, 1985, pp. 446–451.

*Primary Examiner*—Jeffrey E. Russel
*Attorney, Agent, or Firm*—Harold A. Somers; Joseph J. Allocca

[57] ABSTRACT

Claus tail-gas containing $H_2S$ and $SO_2$ in a mol ratio of 2:1 is passed in contact with a catalyst-adsorbent bed (19A) at a temperature of 135° to 150° C. and a space velocity of 50 to 1500 $h^{-1}$ whereby elemental sulfur produced by the reaction of $H_2S$ and $SO_2$ is deposited upon and/or adsorbed on said bed. The resulting sulfurous gas mixture is cooled by indirect heat exchange (26) to a temperature of 120° to 135° C. and liquid elemental sulfur is recovered (27,54,55,101) the sulfurous gas (28) thereafter being cooled and diluted by adding cool inert gas (34) thereto to maintain the water partial pressure below the saturation vapor pressure, and the cooled diluted gas mixture is contacted with a bed of catalyst-adsorbent (32A) at a temperature of 90° to 125° C. whereby further elemental sulfur is produced by the reaction of $SO_2$ and $H_2S$. The elemental sulfur deposits upon and/or is adsorbed on the catalyst-adsorbent and the resulting purified gas (34) is incinerated (37) and discharged (38) to the atmosphere. In one embodiment, the gas from the indirect heat exchange step (26) is contacted with catalyst-adsorbent (30A) at 120° to 135° C. before cool inert gas (34) is mixed therewith, elemental sulfur being deposited upon and/or adsorbed on the catalyst-adsorbent.

Elemental sulfur is removed from the catalyst-adsorbent beds by a hot, inert purge gas (44,46) which is cooled (19B,52) for sulfur recovery. The purge gas is cooled (52) at the end of the sulfur-recovery step to cool the catalyst-adsorbent beds for a further cycle of sulfur recovery from Claus tail-gas.

14 Claims, 3 Drawing Sheets

OFF GAS TO STACK
INCINERATOR
INERT GAS
CLAUS PLANT -17-
SULFUR PIT -101-
$H_2S$ FEED GAS
GUARD FILTER
PURGE

PROCESS FOR REMOVING SULFUR MOIETIES FROM CLAUS TAIL-GAS

The present invention relates to a process for removing sulfur moieties from Claus tail-gas.

In a Claus process, a sulfurous gas containing $H_2S$ and $SO_2$ in a mol ratio of $H_2S$:$SO_2$ of 2:1 is passed in contact with a catalyst to promote the reaction: $2H_2S+SO_2\rightarrow 2H_2O+3S$. The catalyst is an alumina which may contain suitable promoters, and the gas-catalyst contacting temperature is usually in the range 200° to 300° C. or thereabouts.

The aforesaid reaction does not usually proceed to completion and the residual tail-gas usually contains unreacted $H_2S$ and $SO_2$. The tail-gas cannot normally be discharged to the atmosphere since both $H_2S$ and $SO_2$ are noxious and usually present in undesirable quantities. Accordingly, the tail gas is subjected to further processing to remove sulfur compounds. The further processing may include one or more additional stages of contact of the tail gas with an alumina-containing catalyst at elevated temperatures, but the economy of this type of tail-gas clean-up processing is not high, and most Claus process tail-gas after several stages of high-temperature contact with alumina-containing catalyst contains from 1.0 to 3.0 vol % $H_2S$ and/or $SO_2$ (e.g. 1 to 2% $H_2S$; 0.5 to 1% $SO_2$; 1% sulfur vapour and other sulfur moieties such as COS and $CS_2$).

In order to render the tail-gas suitable for discharge to atmosphere, further treatment with solid and/or liquid reagents or absorbents has been used. Some of the processes using liquid reagents or absorbents have advantageously high sulfur-moiety removal abilities, but they involve high investment and operating costs for close control of the chemical reactions, for mitigating corrosion and for regulating the removal and disposal of waste products.

Processes for Claus tail-gas clean-up involving the use of dry catalysts and/or absorbents are known and used. Examples of such dry clean-up processes are described in the following patent documents. DE No. 1667636 (corresponding to U.S. Pat. No. 3,637,352 and GB No. 1249563): DE No. 1943297 (corresponding to CA No. 954674); DE No. 1667641 (corresponding to FR No. 1570161) and DE No. 2319532 (corresponding to U.S. Pat. No. 3,890,120 and GB No. 1420270).

DE No. 2319532 describes contacting the Claus tail-gas at a temperature between ambient and 180° C. with an adsorbent comprising either alumina or silica-alumina until the adsorbent no longer removes sulfur moieties efficiently from the tail-gas. The adsorbent is regenerated by contact with a hot oxygen-free gas at 200° to 350° C. to displace adsorbed sulfur moieties, cooling the adsorbent to 180° C. or lower by contact with an oxygen-free gas which preferably contains water vapour to hydrate the adsorbent to prevent water adsorption from the tail-gas, and then contacting the regenerated and hydrated adsorbent with further quantities of Claus tail-gas.

DE No. 1943297 describes a Claus tail-gas clean-up process wherein the tail-gas is contacted at 120° to 160° C. with an active carbon (e.g., charcoal) adsorbent containing alkali silicates (0.5 to 8.0% $SiO_2$, preferably 3.0 to 7.5% $SiO_2$) whereby $H_2S$ and either $SO_2$ or $O_2$ react to form $H_2O$ and elemental sulfur, the latter being retained in the adsorbent. The elemental sulfur is desorbed by inert gas at 380° to 550° C.

A drawback of dry tail-gas clean-up processes is that although they are relatively simple and involve low costs, they are not adequately effective for the removal of sulfur moieties from tail-gas, and the tail-gas from such dry processes contains from about 1 to 2 percent by volume of sulfur compounds. This drawback arises largely from the fact that water is a product of the reversible dry clean-up process, and the process must be operated at temperatures higher than those leading to high conversions to elemental sulfur in order to prevent water accumulation on the catalyst which would otherwise tend to lead to equilibrium conditions at lower temperatures.

An object of the present invention is to provide a process for removing greater amounts of sulfur moiety from Claus process tail-gas while avoiding the drawbacks of prior processes.

The present invention provides a process for removing sulfur and sulfur compounds from a sulfurous gas containing $H_2S$ and $SO_2$ comprising the steps of: (a) passing the said gas containing $H_2S$ and $SO_2$ in a mole ratio of $H_2S$:$SO_2$ of about 2:1, or in contact with a first stage catalyst at conversion conditions to promote the reaction: $2H_2S+SO_2\rightarrow 2H_2O+3S$; (b) separately recovering, as products from step (a), elemental sulfur and a gas depleted in sulfur moieties; (c) cooling and diluting the gas recovered from step (b), said gas being cooled to a temperature below the freezing temperature of sulfur and being diluted by being mixed with an inert gas such that the partial pressure of water vapour in the gas is less than the equilibrium partial pressure of liquid water and water vapour at the temperature of the resulting cooled and diluted gas mixture; (d) passing the cooled, diluted gas mixture containing $H_2S$ and $SO_2$ in contact with a catalyst-adsorbent mass in a subsequent stage to convert $H_2S$ and $SO_2$ to elemental sulfur which deposits upon and/or is adsorbed on the said mass; and (e) discharging a gas mixture depleted in sulfur moieties.

Preferably the cooling in step (c) is effected at least in part by indirect heat exchange in an indirect heat exchanger, and elemental sulfur is recovered from the thus-cooled sulfurous gas. At least some of the heat recovered from the sulfurous gas in step (c) may be employed to raise steam.

At least part of the cooling in step (c) is preferably effected by the addition of the inert gas at a lower temperature than the sulfurous gas. The inert gas is preferably added to the sulfurous gas after the latter has been cooled by indirect heat exchange. By "inert gas" is meant a gas which does not react chemically with the sulfurous gas when the inert gas and sulfurous gas are mixed. The temperature of the inert gas is preferably from 10° to 30° C., e.g. about 20° C., and preferably its relative humidity is low (e.g. less than 90%, preferably 80% or lower, and most preferably below 50%).

Preferably, the temperature of the sulfurous gas after cooling by indirect heat exchange is in the range of from 120° to 135° C.

The temperature of the sulfurous gas after mixing with the inert gas is preferably in the range of from 90° to 125° C.

Preferably, the sulfurous gas is passed in contact with a catalyst-adsorbent after being cooled but before being diluted with inert gas, the catalyst-adsorbent promoting the reaction $2H_2S+SO_2\rightarrow 2H_2O+3S$, sulfur being retained on the catalyst-adsorbent and a sulfurous gas of lower sulfur moiety content being recovered and diluted with inert gas. Preferably, the temperature of the cooled but undiluted sulfurous gas contacting the said catalyst-adsorbent is in the range of from 120° to 135° C.

Preferably, between steps (b) and (c), the gas is passed in contact with a further catalyst-adsorbent mass to promote the reaction $2H_2S+SO_2 \rightarrow 2H_2O+3S$ at a temperature in the range of from 135° to 150° C. causing elemental sulfur to deposit upon and/or be adsorbed on the said further mass and a gas of reduced sulfur moiety content to pass to step (c).

Elemental sulfur deposited upon and/or adsorbed on catalyst-adsorbent may be recovered by intermittently interrupting the flow of sulfurous gas through the respective catalyst-adsorbent(s), and passing an oxygen-free purge gas at an elevated temperature in contact with the respective catalyst-adsorbent(s) to remove elemental sulfur in the vapour phase, and recovering the thus-removed elemental sulfur in a sulfur-recovery container. Preferably, purge gas is passed through the respective catalyst-adsorbent(s) in a sense opposite to that of the sulfurous gas.

Sulfur-containing purge gas is preferably cooled to recover elemental sulfur therefrom and then reheated to an elevated temperature and thereafter passed in contact with sulfur-containing catalyst-adsorbent.

A part of the purge gas may be employed to prevent access of oxygen-containing gas to elemental sulfur which has been recovered.

Preferably, when the flow of sulfurous gas to a respective catalyst-adsorbent mass is interrupted, the flow of sulfurous gas is diverted to an alternative catalyst-adsorbent mass.

BRIEF DESCRIPTION OF THE DRAWINGS

The process of the present invention is now further described with reference to the accompanying drawings in which.

Figure 1:
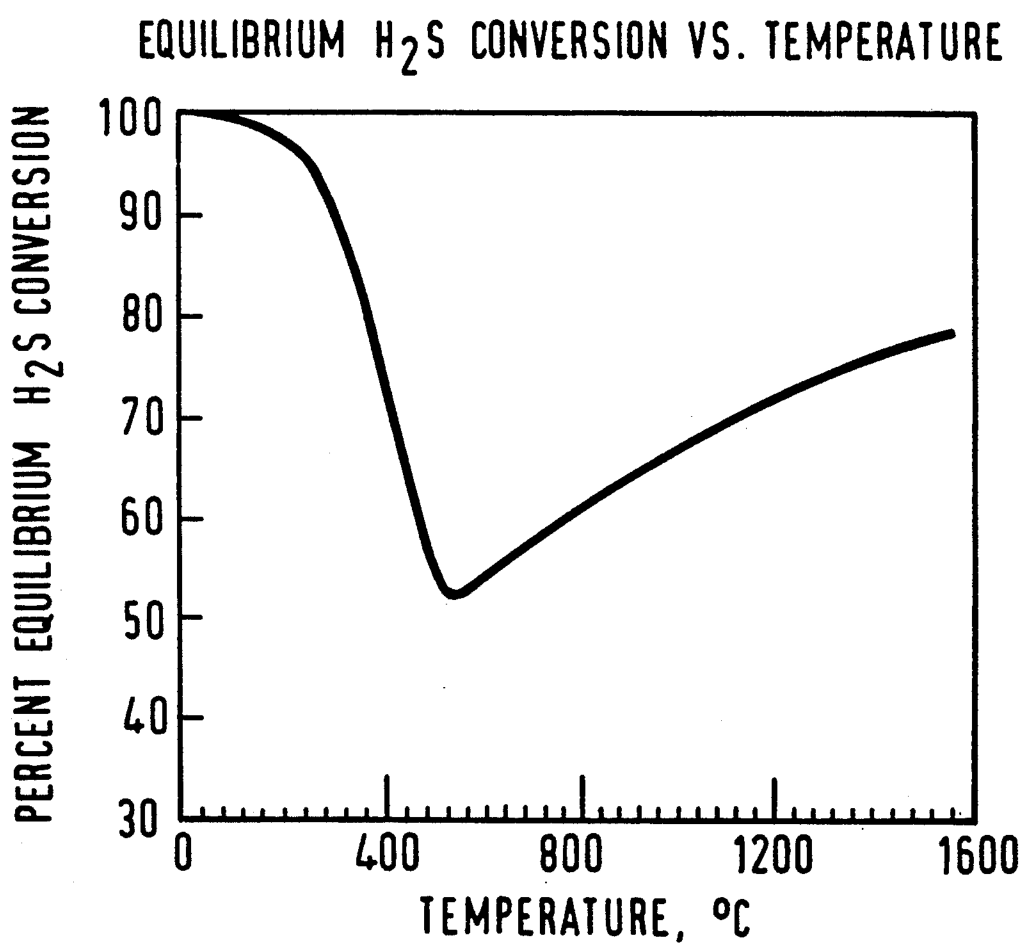
FIG. 1 is a graph of equilibrium $H_2S$ conversion versus temperature for the reaction $2H_2S+SO_2 \rightarrow 2H_2O+3S$.

Referring first to FIG. 1, it will be seen that the highest $H_2S$ conversions to elemental sulfur are obtained at low temperatures, e.g. 200° C. and lower, preferably 135° to 150° C. Temperatures below 135° C. are not usually desirable because the reaction rate is low. As previously mentioned, such low temperatures have proved to be unsatisfactory in prior processes due to the accumulation of water on the catalyst or catalyst-adsorbent which reduces the reaction of $H_2S$ with $SO_2$.

Figure 2:
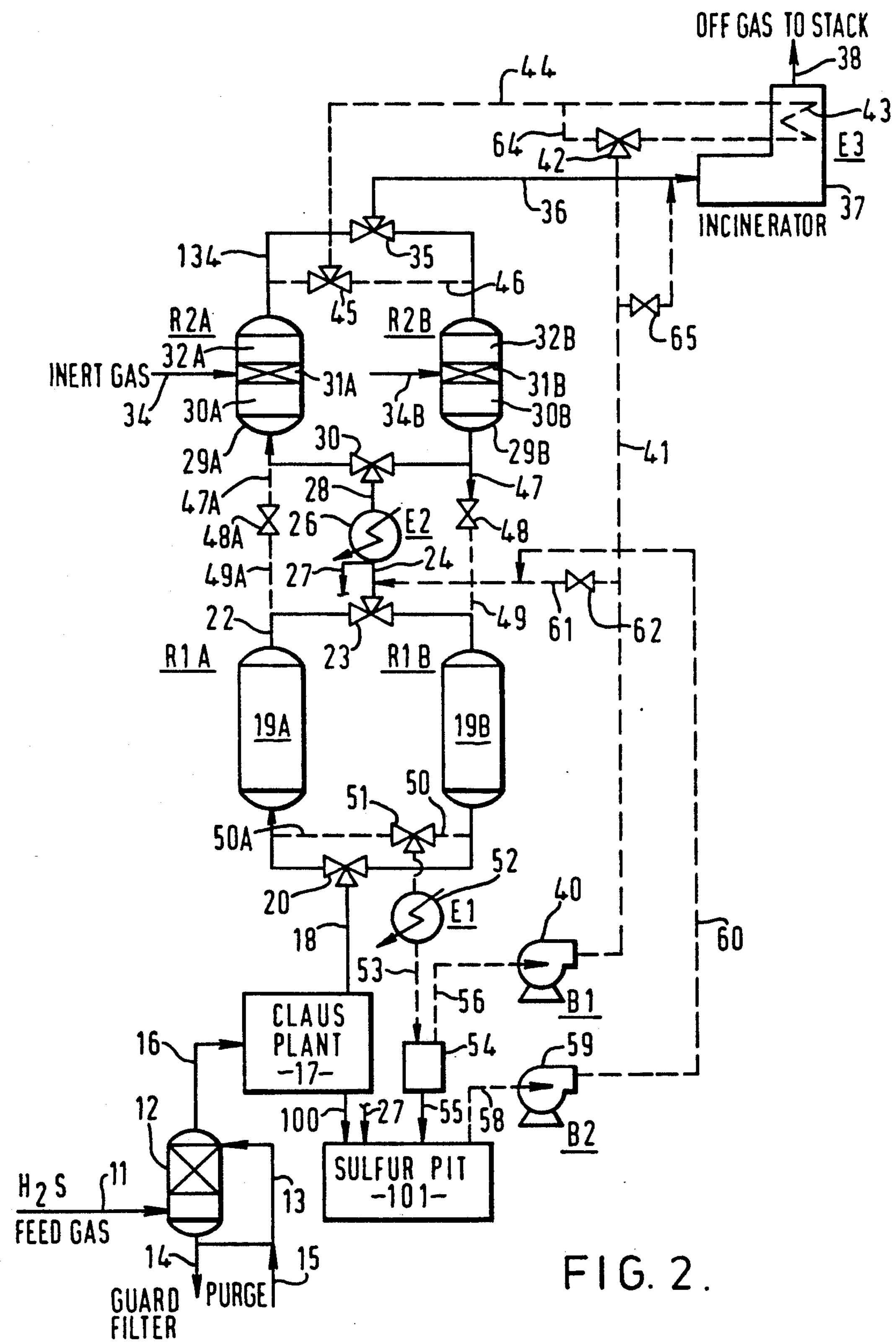
FIG. 2 is a flow sheet of the principal features of a Claus process unit including one type of tail-gas clean-up process equipment in accordance with the present invention, given by way of a non-limitative example thereof.

Reference is now made to the flow sheet of FIG. 2.

A sulfurous feed gas containing $H_2S$ is supplied via line 11 to a so-called guard filter 12 wherein the gas is countercurrently scrubbed with water or a suitable aqueous scrubbing solution to remove ammonia and amines which might otherwise react with sulfur moieties to form solid deposits in the conduits of the plant, and eventually cause blockage of the conduits. The scrubbing solution is recycled in line 13 and a purge is discarded in line 14, make-up solution being added via line 15.

The scrubbed sulfurous gas is passed via line 16 to a Claus plant 17 of conventional type and containing a conventional alumina-containing catalyst. The $H_2S$ in the sulfurous gas is arranged to be in a molar ratio of $H_2S:SO_2$ of 2:1, e.g. by oxidising an appropriate amount of $H_2S$ with air or other oxygen-containing gas. At the elevated temperature in the Claus plant 17, the reactions between $H_2S$ and $SO_2$ can be represented by:

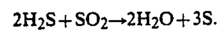

$$2H_2S+SO_2 \rightarrow 2H_2O+3S.$$

The Claus plant may contain one, two or three (or more) beds of catalyst, and the sulfurous gas leaving the Claus plant 17 via line 18 contains elemental sulfur, water vapour, and unreacted $H_2S$ and $SO_2$. Most of the elemental sulfur from the Claus plant is recovered in line 100 and stored in a sulfur storage facility, such as a sulfur pit 101.

The gas in line 18 is diverted by a three-way diverting valve 20 to one of two reactors 19A and 19B. During operation, one reactor is in use for further conversion of $H_2S$ at low temperatures and the other reactor is involved in a regeneration and purge step, which is described herein. It will be assumed for the purpose of illustration that reactor 19A receives gas from line 18 and that reactor 19B is involved in the regeneration and purge step. Both reactors 19A and 19B contain a catalyst-adsorbent bed. The catalyst adsorbent may be of any suitable type such as an activated alumina-containing catalyst or an activated carbon-containing catalyst. One type of catalyst which may be employed comprises active carbon containing alkali silicate (about 4 weight % $SiO_2$, based on total catalyst-adsorbent). The catalyst-adsorbent beds are operated under sulfur-subdew-point conditions in the temperature range of about (inlet temperature) 135° C. to about 145° C. (outlet temperature) and a space velocity in the range 50 to 500 $h^{-1}$. The mol ratio of $H_2S$ to $SO_2$ in the reactor 19A is regulated, in the known manner, to 2:1 or thereabouts. $H_2S$ and $SO_2$ react to form elemental sulfur, which deposits upon and/or is adsorbed on, the catalyst in reactor 19A, and water vapour which is largely recovered in the tail-gas.

The sulfurous tail-gas from reactor 19A with a depleted content of sulfur moieties is recovered via line 22 at a temperature of about 145° C. and diverted by three-way diverting valve 23 to line 24 which conducts the gas to a cooler 26, wherein it is cooled to a temperature in the range of from 120° to 130° C., preferably 125° C. or thereabouts. Sulfur condenses in the cooler 26 and is recovered via line 27, and conducted to the sulfur pit 101. The cooler 26 may be of the waste heat boiler type, and may be employed to raise low pressure steam (at about 150 kPa gauge pressure).

The cooled, sulfur-depleted sulfurous gas leaves the cooler 26 via line 28 and is passed to one of two identical reactor vessels 29A, 29B by a diverting valve 30. While one vessel 29A or 29B is operative, the other vessel is involved in a regeneration and desorption step. It will be assumed, for the purpose of illustration only, that vessel 29A is operative and vessel 29B is involved in the regeneration and desorption step.

Within each vessel 29A, 29B, there are three distinct zones which are contacted in sequence by the sulfurous gas flowing therethrough as follows: a lower zone 30A or 30B containing catalyst-adsorbent, an intermediate zone 31A or 31B with acid-resistant materials for promoting mixing of sulfurous gas from the lower zone with cool, inert gas, and an upper zone 32A or 32B containing catalyst-adsorbent.

The sulfurous gas at 120° to 130° C., preferably 125° C. or thereabouts, is conducted into contact with the catalyst-adsorbent in the lower zone 30A of vessel 29A, wherein further reaction of $H_2S$ and $SO_2$ to produce elemental sulfur is caused and droplets of elemental sulfur entrained from the cooler 26 are captured. The elemental sulfur is deposited upon and/or adsorbed on the catalyst-adsorbent. The elemental sulfur deposit may be in the form of a "frost" of elemental sulfur.

The sulfurous gas, depleted in sulfur moiety but augmented in water vapour, is cooled and diluted in zone 31A by adding thereto cool inert gas from line 34. The cool inert gas cools the resulting gas mixture to a temperature in the range of from 90° to 125° C. and dilutes the gas mixture so that the water dewpoint is not reached at that temperature, whereby no liquid water is deposited.

The cool inert gas is at a temperature lower than that of the sulfurous gas, and is preferably at about ambient temperature, e.g. in the range 10° to 25° C., preferably 15° to 20° C. The cool inert gas may be a waste gas from the present process, or it may be a flue gas from another process, or it may be air. When air is employed, the air may be diluted with waste gas and/or flue gas.

The cool sulfurous gas mixture passes from the second zone 31A to the third zone 32A where reaction of $H_2S$ and $SO_2$ to elemental sulfur proceeds virtually to completion with a water partial pressure of 30% or less of the saturation water pressure. The elemental sulfur deposits upon and/or is adsorbed on the catalyst-adsorbent (e.g. as a "sulfur-frost"), and a final gas product is recovered in line 134 and directed by a three-way valve 35 to exhaust line 36, incinerator 37 and stack conduit 38. The incinerator 37 operates under oxidizing conditions and high temperature to convert any residual $H_2S$ and other sulfur moieties to sulfur oxides for discharge to the atmosphere.

As will be appreciated and readily understood by those knowledgeable in the art, the lower the temperature at which the reaction between $H_2S$ and $SO_2$ is effected, the more complete it will be. This is apparent from FIG. 1. The reactions in the vessel 29A are effected at temperatures in the range 90° to 125° C., and it will be seen from FIG. 1 that in this temperature range, the reactions between $H_2S$ and $SO_2$ go virtually to completion so that the final gas product leaving vessel 29A via line 134 will be almost totally free of $H_2S$ and $SO_2$. A mole ratio of $H_2S$ to $SO_2$ of 2:1 is regulated throughout all the plant so far described in a manner which is well-known to those skilled in the art.

While the sulfurous gas is passing from the Claus plant 17 into vessels 19A and 29A, elemental sulfur which has previously been deposited in vessels 19B and 29B (by process steps similar to those described in connection with vessels 19A and 29A) is subjected to a recovery process which also regenerates and reconditions the catalyst-adsorbent masses therein.

An inert, oxygen-free purge gas (e.g. a flue gas) is circulated by a fan 40 via a line 41 and three-way valve 42 to a heater element 43, which may be a heat exchanger or heating coil in the flue gas region of the incinerator 37. The purge gas is heated to a temperature in the range of from 300° to 450° C., according to the heat requirements for the subsequent sulfur-recovery steps, and is passed via line 44 to a diverter valve 45 which directs the hot purge gas through line 46 into the vessel 29B wherein it contacts, in sequence, the bed 32B, the zone 31B and the bed 30B, desorbing and vapourizing elemental sulfur therefrom, the thus desorbed and vaporized sulfur being entrained with the hot purge gas. The hot purge gas passes into line 47 and via a valve 48 to line 49 from which it enters vessel 19B, desorbing and vapourizing elemental sulfur from the catalyst-adsorbent therein. The sulfur-laden purge gas is recovered in line 50 and is directed by a three-way diverting valve 51 to a cooler 52 which cools the gas to a sulfur-condensing temperature (e.g. about 135° C.).

The cooler 52 may be of the waste heat boiler type whereby at least some of the heat recovered from the sulfur-laden purge gas stream is utilized to raise low-pressure steam.

The cooled purge gas is conducted from the cooler 52 via line 53 to a knock-out drum 54 which serves to separate elemental sulfur from the cool purge gas. The separated elemental sulfur is conducted by line 55 to the sulfur pit. The sulfur which accumulates in line 55 serves as a seal. Most or all of the cool purge gas is recovered from the drum 54 in line 56 connected to the suction side of fan 40 for recirculation in the manner already described.

Optionally, in order to avoid or reduce the risk of fire in the sulfur pit 101, a minor flow of a purge gas of steam and air is passed via line 55 into the pit 101. The purge gas from the pit 101 is recovered in line 58 which is connected to the suction side of a blower, ejector or fan 59 which circulates the gas via line 60 into line 61 when valve 62 is closed. The purge gas with any entrained sulfur moiety is directed into line 24 where it mixes with the sulfurous gas stream passing to cooler 26. When valves 62 and 65 are open, the purge gas passes via lines 41 and 36 to the incinerator 37 wherein sulfur moiety is oxidized to $SO_2$. the amount of sulfur moiety contained in the purge gas will be insignificant during normal operation.

When the deposited and adsorbed sulfur in vessels 29B and 19B has been substantially completely removed by hot purge gas, or alternatively, after a predetermined period of passing hot purge gas through the vessels 29B and 19B, the catalyst-adsorbent in the vessels is cooled for use in a subsequent sulfur-recovery cycle (such as that described in connection with the operation of vessels 19A and 29A) by altering the setting of the diverting valve 42 so that the purge gas is directed via line 64 into line 44 without passing through the heater element 43. The purge gas is progressively cooled by cooler 52 to a predetermined temperature in the range 90° to 135° C. and is circulated until the catalyst-adsorbent beds in the vessels 19B and 29B have been cooled to, or almost to, their operating temperature ranges.

When the catalyst-adsorbent beds in vessels 19B and 29B have been suitably cooled, the sulfurous gas from the Claus plant 17 may be diverted to pass through them while the catalyst-adsorbent in vessels 19A and 29A is contacted with hot purge gas to recover sulfur therefrom in the manner described in relation to vessels 19B and 29B. The change in the operating modes of the two sets of vessels 19A, 29A and 19B, 29B is effected in the following way:

The blowers 40 and 59 may be inactivated and/or a by-pass valve 65 is temporarily opened so that purge gas is temporarily passed via the incinerator 37 to atmosphere. The three-way diverter valves 20, 23, 30 and 35 are reset to pass sulfurous gas originating from the Claus plant 17 via line 18 to vessel 19B and thence to line 24, cooler 26, line 28, vessel 29B, line 36, the incinerator 37 and stack line 38. Cool, inert gas which previously was passed into zone 31A from line 34 is diverted to line 34B by a suitable valve (not shown) and passes into zone 31B.

When the vessels 19B and 29B are operating to recover sulfur on the catalyst-adsorbent therein, sulfur may be recovered from the vessels 19A and 29A by purging the latter with hot purge gas as described in connection with the purging of the vessels 19B and 29B, and when vessels 19A and 29A are adequately purged, they are preferably cooled by contact with cool purge gas in the manner described with reference to the vessels 19B and 29B.

The hot purging of vessels 19A and 29A is effected by closing valve 65 and altering the setting of the three-way valve 42 so that purge gas passes to the heating element 43 in the incinerator 37. The hot purge gas is conducted via line 44 to valve 45 which is adjusted to direct the gas into bed 32A, zone 31A and bed 30A in vessel 29A. The sulfur-containing hot purge gas passes via line 47A through valve 48A (which is now open) and line 49A into line 22 and vessel 19A wherein it removes elemental sulfur from the catalyst-adsorbent therein. The sulfur-laden hot purge gas is recovered in line 50A and conducted to the cooler 52 via diverter valve 51 which is appropriately adjusted. Sulfur is recovered from the cooled purge gas via line 53 and is stored in sulfur storage pit 101, preferably under a blanket of inert purge gas.

When the catalyst-adsorbent masses in vessels 19A and 29A have been at least partially stripped of deposited and/or adsorbed sulfur, they are cooled to a sulfur-retaining temperature by contact with cool purge gas in the manner described with reference to vessels 19B and 29B.

The two sets of vessels, respectively 19A, 29A and 19B, 29B, may each be used alternately for sulfur capture and purging in the manner described.

The conditions of operation for the catalyst-adsorbent beds in the vessels 29A and 29B can tend to cause deterioration in the performance of the catalyst-adsorbent, and it may be desirable or necessary to replace at least some of the catalyst-adsorbent mass from time-to-time. During such replacement, the flow of gas through one or both beds of catalyst-adsorbent in each vessel 29A or 29B is interrupted so that deactivated catalyst-adsorbent can be replaced, at least in part, with active catalyst-adsorbent. During the interruption of gas flow through the respective bed(s), the gas is diverted through a suitable by-pass (not shown) in a manner which will be readily appreciated and understood by those skilled in the art. The maintenance of high activity in the beds 30A, 32A and 30B, 32B can compensate for any diminution in activity of the catalyst-adsorbent in the vessels 19A and 19B.

The recovery of sulfur is maintained above 99.5% during correct operation of the process described with reference to FIG. 2.

Figure 3:
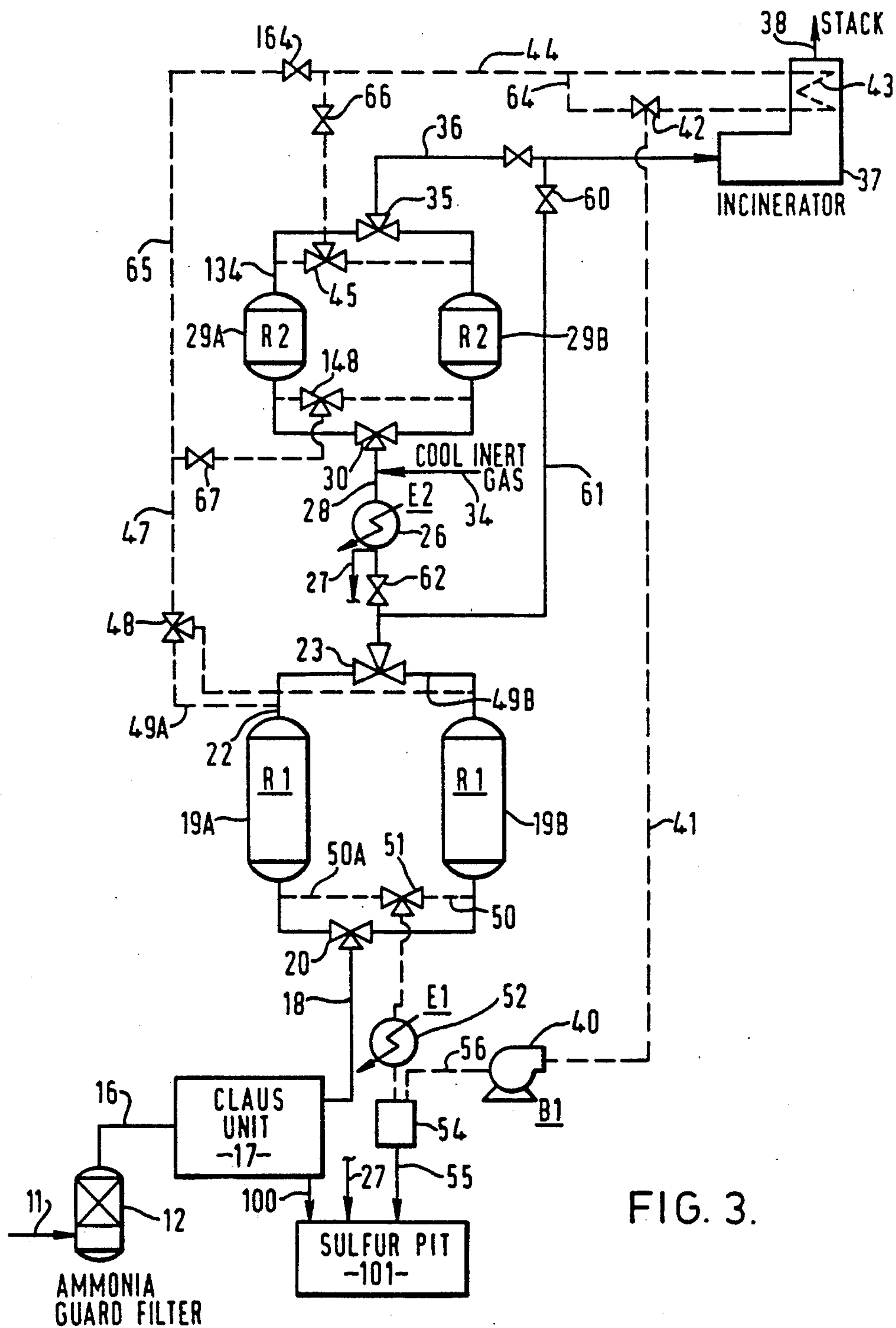
FIG. 3 is a flow sheet of the principal features of a Claus process unit including another type of tail-gas clean-up process equipment in accordance with the invention, given by way of a non-limitative example thereof.

Reference is now made to FIG. 3 wherein items in common with FIG. 2 are given the same reference numbers. The embodiment of FIG. 3 is arranged to operate in a manner similar to that of FIG. 2 with the principal distinction that the vessels 29A and 29B each contain a single bed of catalyst-adsorbent, and the cool, inert gas is added to cooled sulfurous gas leaving the cooler 26 at a temperature in the range of from 120° to 135° C., preferably 125° C., or thereabouts. The catalyst-adsorbent beds in the vessels 19A and 19B operate at an average temperature of about 150° C. during their desulfurization and sulfur-capture mode.

The three-way valve 23 controls the passage of sulfurous gas from the operative catalyst-adsorbent bed in one of the vessels 19A or 19B to the cooler 26, and the three-way valve 48 controls the passage of hot purge gas from the vessels 29A and 29B via the three-way valve 148, the conduit 47, and the respective conduits 49A, 49B to the vessels 19A and 19B for the purpose of recovering elemental sulfur from the beds in the vessels 29A, 29B and 19A, 19B in much the same manner as has already been described with reference to FIG. 2.

The duties imposed on the catalyst-adsorbent in the vessels 29A and 29B of FIG. 3 are likely to be more severe than those imposed on the catalyst-adsorbent in the vessels 29A and 29B of FIG. 2. Accordingly, by-pass means are provided to by-pass the vessels 29A and 29B so that the catalyst-adsorbent therein may be changed. The by-pass means comprise a first by-pass valve 60 in a first by-pass line 61 which, when valve 62 (between valve 23 and cooler 26) is closed, enables sulfurous gas leaving the reactor 19A or 19B to pass directly to the incinerator 37. The by-pass means further comprise a second by-pass valve 164 in a second by-pass line 65 which, when valve 66 (between line 44 and three-way valve 45) is closed, enables hot purge from line 44 to pass via the second by-pass line 65 to one of the reactors 19A, 19B to remove sulfur therefrom in the manner described (valve 67, between line 47 and valve 148 being closed). While the vessels 29A, 29B are thus by-passed both by sulfurous gas from the vessels 19A, 19B and by hot purge gas, the catalyst-adsorbent therein can be replaced, at least in part. It is envisaged that such replacement might be necessary every 2 to 4 years. The temporary discharge of sulfurous gas to atmosphere during the catalyst adsorbent replacement would be of short duration and within acceptable limits.

The embodiments described are given by way of illustration only, and do not limit the scope of the invention which is defined by the appended claims.

A feature or combination of features of one embodiment may be employed in the other embodiment in any technically-feasible arrangement without departing from the invention as defined by the appended claims.

It will be appreciated by those skilled in the art that the equipment required for realising the Claus tail-gas clean-up process of the invention involves relatively low investment and operating costs and is considerably cheaper in both respects relative to known, practicable Claus tail-gas clean-up equipment. Moreover, the equipment may be readily incorporated in an existing Claus plant or it may be part of a new Claus plant.

What is claimed is:

1. A process for removing sulfur and sulfur compounds from a sulfurous gas containing $H_2S$ and $SO_2$ comprising the steps of:

(a) passing the said gas containing $H_2S$ and $SO_2$ in a mol ratio of $H_2S:SO_2$ of about 2:1 in contact with a first stage catalyst at conversion conditions to promote the reaction: $2H_2S+SO_2 \rightarrow 2H_2O+3S$;

(b) separately recovering, as products from step (a), elemental sulfur and a gas depleted in sulfur moieties;

(c) cooling and diluting the gas recovered from step (b), said gas being cooled to a temperature below the freezing temperature of sulfur and being diluted by being mixed with an inert gas such that the partial pressure of water vapour in the gas is less than the equilibrium partial pressure of liquid water and water vapour at the temperature of the resulting cooled and diluted gas mixture;

(d) passing the cooled, diluted gas mixture containing $H_2S$ and $SO_2$ in contact with a catalyst-adsorbent mass in a subsequent stage to convert $H_2S$ and $SO_2$ to elemental sulfur which deposits upon and/or is adsorbed on the said mass; and (e) discharging a gas mixture depleted in sulfur moieties.

2. A process as in claim 1 in which the cooling in step (c) is effected at least in part by indirect heat exchange in an indirect heat exchanger, and elemental sulfur is recovered from the thus-cooled sulfurous gas.

3. A process as in claim 1 in which at least part of the cooling in step (c) is effected by the addition of the inert gas at a lower temperature than the sulfurous gas.

4. A process as in claim 3 in which the inert gas is added to the sulfurous gas after the latter has been cooled by indirect heat exchange.

5. A process as in claim 2 in which the temperature of the sulfurous gas after cooling by indirect heat exchange is in the range of from 120° to 135° C.

6. A process as in claim 1 in which the temperature of the sulfurous gas after mixing with the inert gas is in the range of from 90° to 125° C.

7. A process as in claim 2 wherein the sulfurous gas is passed in contact with a catalyst-adsorbent after being cooled but before being diluted with inert gas, the catalyst-adsorbent promoting the reaction $2H_2S+SO_2\rightarrow 2H_2O+3S$, sulfur being retained on the catalyst-adsorbent and a sulfurous gas of lower sulfur moiety content being recovered and diluted with inert gas.

8. A process as in claim 7 wherein the temperature of the cooled but undiluted sulfurous gas contacting the said catalyst-adsorbent is in the range of from 120° to 135° C.

9. A process as in claim 1 in which between steps (b) and (c), the gas is passed in contact with a further catalyst-adsorbent mass to promote the reaction $2H_2S+SO_2\rightarrow 2H_2O+3S$ at a temperature in the range of from 135° to 150° C. causing elemental sulfur to deposit upon and/or be adsorbed on the said further mass and a gas of reduced sulfur moiety content to pass to step (c).

10. A process as in claim 1 wherein elemental sulfur deposited upon and/or adsorbed on catalyst-adsorbent is recovered by intermittently interrupting the flow of sulfurous gas through the respective catalyst-adsorbent(s), and passing a hot oxygen-free purge gas in contact with the respective catalyst-adsorbent(s) to remove elemental sulfur in the vapour phase, and recovering the thus-removed elemental sulfur in a sulfur-recovery container.

11. A process as in claim 10 in which purge gas is passed through the respective catalyst-adsorbent(s) in a direction opposite to that of the sulfurous gas.

12. A process as in claim 10 in which sulfur-containing purge gas is cooled to recover elemental sulfur therefrom and then reheated to an elevated temperature and thereafter passed in contact with sulfur-containing catalyst-adsorbent.

13. A process as in claim 10 in which a part of the purge gas is employed to prevent access of oxygen-containing gas to elemental sulfur which has been recovered.

14. A process as in claim 10 in which when the flow of sulfurous gas to a respective catalyst-adsorbent mass is interrupted, the flow of sulfurous gas is diverted to an alternative catalyst-adsorbent mass.

* * * * *